Sept. 6, 1927.
H. J. MURRAY
1,641,946
MOVABLE DIELECTRIC CONDENSER
Filed Jan. 29, 1925
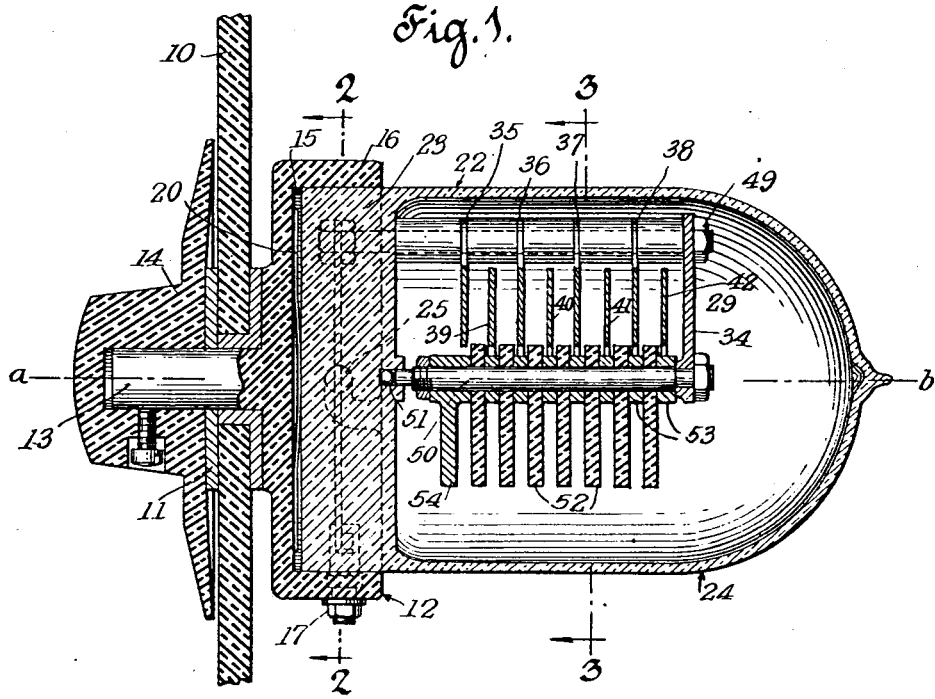
INVENTOR
Howard J. Murray
BY Warren S. Orton.
ATTORNEY Patented Sept. 6, 1927.

1,641,946

UNITED STATES PATENT OFFICE.

HOWARD J. MURRAY, OF BROOKLYN, NEW YORK.

MOVABLE DIELECTRIC CONDENSER.

Application filed January 29, 1925. Serial No. 5,472.

The invention relates in general to variable electric condensers of the type commonly used in connection with wireless or similar work where refinement in adjustment is required and the present disclosure constitutes a continuation of the invention relating to vacuum tube condensers disclosed in my co-pending application on electric instruments, filed November 6, 1923, Serial No. 673.066, and constitutes a companion case with my co-pending application on "liquid dielectric condensers."

The primary object of the invention is to provide an improved form of electric condensers and particularly to provide a condenser which will minimize electric leakage from the oppositely charged active surfaces of the condenser plates.

All forms of variable electric condensers now in general use have their active surfaces exposed at all times to the dielectric between the oppositely charged faces and which dielectric is usually air or other gas, sometimes with the gas under pressure. There is an electric leakage from these active surfaces to the dielectric therebetween so that all known forms of condensers leak into the constantly present dielectric. The present disclosure like the disclosure in the previously filed application, above identified, features the maintaining of a vacuous space in so far as can be produced economically between the oppositely charged plate faces in order to minimize this electric leakage.

Instead of moving the oppositely charged surfaces to obtain variation in capacity, the present disclosure features the fixing of the surfaces relative to each other so that the spacing factor will be fixed under all conditions of adjustment in the capacity of the condenser. Instead of moving one of the active surfaces, variation in capacity is attained in the device hereinafter disclosed by moving the dielectric.

Another object of the invention is to provide in a device of the type outlined capacity providing means which can be accurately controlled from its maximum capacity to zero capacity, so that normally the parts can be disposed so as to be devoid of capacity, and devoid, therefore, or at least substantially devoid, of any electric losses.

Another object of the invention is to provide a condenser housed in a vacuum tube which can be marketed as an article of manufacture and which can be mounted in a suitable socket and locked in position with the condenser elements located in preset position and with proper connections made automatically with the external circuit.

Various other objects and advantages of the invention will be in part obvious from an inspection of the accompanying drawings and in part will be more fully set forth in the following particular description of one form of device embodying my invention and the invention also consists in certain new and novel features of construction and combination of parts hereinafter set forth and claimed.

In the accompanying drawing:—

Figure 1 is a view taken in axial section through a preferred embodiment of the invention mounted on a support; and Figures 2 and 3 are each transverse sectional views taken respectively on the lines 2—2 and 3—3 of Figure 1 looking in the direction indicated by the arrows.

In the following description and in the claims, parts will be identified by specific names for convenience of expression but they are intended to be as generic in their application to similar parts as the art will permit.

In the drawings there is shown a support 10 which may be regarded as the mounting board of a radio receiving set where the disclosure is utilized in such a set. Rotatably mounted in bushing 11 is a socket 12 provided centrally thereof with a shaft 13 extending forwardly from the socket through the bushing 11. The forward end of the shaft is secured to a dial knob 14 which may be graduated as is usual in the control knobs of condensers of this type. The socket 12 includes a flat open end cylindrical bulb receiving recess 15 outlined by a flange 16. Extending through one side of this flange is a pair of circumferentially spaced apart terminals 17 and 18. The inner faces of these terminals are provided respectively with contact plates 19 and 20 flush with the inner periphery of the flange as particularly shown in Figure 2. The bottom of the recess 15 is provided with a flat spring 21 to assist in ejecting the vacuum tube 22 particularly forming the subject matter of the invention.

The vacuum tube 22 includes a relatively thick flat cylindrical base 23 and a hollow thin wall shell portion 24 projecting axially therefrom. The base is designed to fit in the recess 13 of the socket and is designed to have sufficient rigidity to support the condenser forming elements and thus supporting frame and shaft hereinafter described. Preferably the tube is locked in position against accidental displacement and in order to insure the proper locating of the leads from the condenser elements in their connection with the plates 19 and 20. For this purpose the periphery of the base is provided with a pair of outstanding pins 25 and 26 which are designed to be moved respectively into bayonet slot recesses 27 and 28 formed in the flange of the socket as particularly shown in Figures 2 and 3.

The condenser elements are mounted on a metal frame 29 contained in the vacuous space in the part 24 of the tube. This frame includes four parallel and circumferentially spaced apart supporting rods, numbered clockwise in Figure 2 with designations 30, 31, 32 and 33. These rods are anchored at their forward ends in the thick base 23 and are connected at their opposite ends by a metallic end plate 34, which end plate is substantially semi-circular in elevation. These rods support two sets of condenser plates electrically insulated from each other. Each alternate rod supports alternate plates, for instance, plates numbered 35, 36, 37 and 38 are supported from the rods 30 and 32. The intermediate plates 39, 40, 41 and 42 are similarly supported from the rods 31 and 33. Rod 31 is connected through a flat strip conductor 43 with a spring contact 44 designed to engage the plate 19 and similarly the rod 32 is connected by a strip 45 with a spring contact 46 resiliently engaging the plate 18. From this construction it will be seen that the adjacent plates are fixed relative to each other and present active faces oppositely disposed and with a constant distance between adjacent plates. It is also noted that the active plates both move when the tube as a whole is located about its axis indicated by the line $a$—$b$. In the illustrated showing the plates are of the conventional semi-circular form with fastening lugs 47 projecting from their curved peripheries to engage their associated supporting rods, but the configuration of these plates is immaterial. The plates are maintained in their prefixed spaced apart relation on their supporting rods by means of spacing sleeves 48 and a nut 49. The free end of each rod bears against the end plate 34 and assists in holding the parts in fixed position.

Rotatably mounted in the vacuous space within the tube 24 and extending axially of the axis $a$—$b$ is a pendulum shaft 50 one end of which is mounted in anti-friction end thrust bearings 51 contained in the center of the rear face of the base 23. The other end of the shaft is rotatably mounted in the lower edge of the end plate 34. The shaft provides a support for a series of plates 52 hereinafter indentified both separately and collectively as dielectrics. These plates may be formed of any suitable dielectric substance, such as silk or glass and in the disclosure it is to be assumed that these plates are made of mica. The plates are maintained in spaced apart position on the shaft by means of spacing sleeves 53. The plates are eccentrically mounted and unbalanced so as to extend for the most part from the axis of rotation of the shaft, as indicated in Figure 3 so that normally the plates will constitute a pendulum and will be held in their lowermost position by gravity. In this way the dielectric forming plates will be held fixed in space. For fear that the plates will not be of sufficient weight of themselves to insure the pendulum effect it is herein suggested that a weighted pendulum 54 be secured to one of the spacing sleeves, preferably the spacing sleeve at the inner or base end of the shaft. In actual practice this separate pendulum is omitted. It is herein suggested, although not necessary, that the dielectric plates have a width so as substantially to fill the gap or space between the adjacent active surfaces of the condenser plates and in this way take advantage, in so far as is physically possible, of the dielectric either completely filling or completely voiding the usual dielectric space between the normal active surfaces.

In operation it will be understood that the condenser can be adjusted in the same way as similar instruments are adjusted at present. With the parts shown in the position illustrated, the plates which normally constitute the oppositely charged plates are not active due to the fact that in the absence of the dielectric, even the absence of the usual air dielectric, the device is prevented from functioning as a condenser and this theoretical non-capacity and non-leakage condition would be present if there was a complete vacuum in the tube.

Rotating the knob by external manipulation will carry both sets of the condenser plates bodily into position to be interleaved by the relatively fixed mica plates. Starting with the active plates and the dielectric unlapped and therefore not even functioning as a condenser the progressive rotation of the plates and dielectric into interleaved relation will increase the capacity of the instrument until the dielectric plates are in fully overlapped relation to the active plates at which time the instrument has its maximum capacity.

While it is assumed that there will be electric losses between the condenser plates and the movable dielectric, these losses will occur only over these areas which are mutually lapped and there will be little, if any, losses from the portion of the plates which are not faced with the dielectric.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a variable electric condenser, the combination of a support, a socket mounted therein for rotary movement about a fixed axis of rotation, a vacuum tube demountably secured in said socket to rotate therewith, four rods fixed relative to each other and carried by the tube to rotate therewith, a set of condenser plates supported by two of said rods, a co-acting set of condenser plates supported by the other two rods and disposed parallel to the plates in the first set, the plates of one set alternating with the plates of the other set, said sets of plates being insulated from each other, a shaft mounted for rotary movement relative to the tube and concentric relative to said axis of rotation, said shaft provided with a set of plates constituting a dielectric adapted to be interleaved between the condenser plates, a pendulum acting on the dielectric plates to hold the same fixed in place as the condenser plates are rotated relative to the same as the tube is rotated and means for locating the tube in fixed position in the socket.

2. In a variable electric condenser, the combination of a support, a socket mounted therein for rotary movement about a fixed axis of rotation, a vacuum tube demountably secured in said socket to rotate therewith, four rods fixed relative to each other and carried by the tube to rotate therewith, a set of condenser plates supported by two of said rods, a co-acting set of condenser plates supported by the other two rods and disposed parallel to the plates in the first set, the plates of one set alternating with the plates of the other set, said sets of plates being insulated from each other, a shaft mounted for rotary movement relative to the tube and concentric relative to said axis of rotation, said shaft provided with a set of plates constituting a dielectric adapted to be interleaved between the condenser plates, and a pendulum acting on the dielectric plates to hold the same fixed in place as the condenser plates are rotated relative to the same as the tube is rotated.

3. In a device of the class described, the combination of a vacuum tube having a base adapted to be mounted in a socket, a variable electric condenser contained in said tube, said condenser including a pair of elements supported from said base, insulated from each other and adapted to provide oppositely charged surfaces, a pair of conductors one for each element, extending from their respective elements through said base and having their outer ends exposed for electrical connection, and means for providing a dielectric for said surfaces.

4. In a device of the class described, the combination of a socket provided with a pair of terminals, a vacuum tube demountably positioned in the socket, a variable electric condenser contained in said tube, said condenser including a pair of elements insulated from each other and adapted to provide oppositely charged surfaces, each element provided with a conductor leading through the tube with its outer end exposed and adapted to be connected electrically to one of the socket terminals, and means entirely contained in said tube and movable relative to said surfaces to provide a dielectric between the same.

5. In a device of the class described, the combination of a vacuum tube mounted for rotary movement about a horizontal axis and having a condenser contained therein, said condenser having its oppositely charged surfaces mounted in the tube and fixed relative to each other and to the tube to rotate therewith, a dielectric mounted for rotary movement relative to the tube about said axis, said dielectric being held gravitationally as the charged surfaces are rotated relative thereto in changing the capacity of the condenser, and a pair of conductors leading through the tube to the charged surfaces, one connected electrically to each surface.

6. In a device of the class described, the combination of a vacuum tube mounted for rotary movement about a horizontal axis and having a condenser contained therein, said condenser having its oppositely charged surfaces mounted in the tube and fixed relative to each other and to the tube to rotate therewith, a dielectric mounted for rotary movement relative to the tube about said axis and said dielectric being held gravitationally as the charged surfaces are rotated relative thereto in changing the capacity of the condenser.

7. In a device of the class described, the combination of a closed tube, a variable condenser contained therein, a metallic frame carried by the tube, metallic elements insulated from each other carried by said frame and providing oppositely charged surfaces, a shaft having one end journalled in said frame, a dielectric carried by the shaft and adapted to be disposed between said surfaces, said dielectric constituting in effect a pendulum mounted to swing freely about the axis of the shaft.

8. A variable condenser including a vacuum tube, means fixed to the tube and disposed within the vacuous space in the tube capable of forming the oppositely charged condenser surfaces, means forming a dielectric substantially fixed in space, said first named means being movable with the tube relative to the dielectric forming means to vary the capacity of the condenser.

9. In a device of the class described, the combination of a base, a pair of elements mounted on said base in mutually fixed and insulated relationship, said elements having spaced parallel surfaces, and a dielectric pivotally supported on said base and adapted to rock to present variable portions of itself between said surfaces.

10. In a device of the class described, the combination of a base, means to support said base for rocking about a horizontal axis, a pair of elements mounted on said base in mutually fixed and insulated relationship, said elements having spaced parallel surfaces, a dielectric pivotally supported on said base, and having a counterweight to hold the dielectric stationary during the relative movement of the said surfaces while the said base is being rocked, said dielectric being adapted to present variable portions of itself between said surfaces in proportion to the amount of rocking of said base.

Signed at New York in the county of New York and State of New York this 28th day of January, A. D. 1925.

HOWARD J. MURRAY.